United States Patent
Goerlich et al.

[11] Patent Number: 5,440,140
[45] Date of Patent: Aug. 8, 1995

[54] METHOD AND ARRANGEMENT FOR DETERMINING AN AT LEAST APPROXIMATELY CIRCULAR CONTACTING SURFACE USING INCOHERENT LIGHT AND A FILM WAVEGUIDE

[75] Inventors: Steffen Goerlich; Wolfgang Merker; Peter Voigt, all of Jena; Norbert Klose, Graitschen; Klaus Moehr, Eisenberg; Joachim Wieser, Jena, all of Germany

[73] Assignee: Jenoptik GmbH, Jena, Germany

[21] Appl. No.: 222,680

[22] Filed: Apr. 4, 1994

[30] Foreign Application Priority Data
Apr. 16, 1993 [DE] Germany .............. 43 12 403.8

[51] Int. Cl.⁶ .................................................. A61B 3/16
[52] U.S. Cl. ............................ 250/559.24; 250/227.32; 128/645; 128/652
[58] Field of Search ............ 250/560, 561, 559, 208.2, 250/227.32, 227.31, 227.29, 227.24, 227.25, 227.14, 571, 573; 385/129, 116; 128/645, 646, 652, 653.5; 351/208, 214, 221

[56] References Cited

U.S. PATENT DOCUMENTS

| | | | |
|---|---|---|---|
| 3,913,390 | 10/1975 | Piazza | 128/652 |
| 4,622,459 | 11/1986 | Bouge et al. | 250/214 AL |
| 4,735,209 | 4/1988 | Foody | 128/652 |
| 4,987,899 | 1/1991 | Brown | 128/645 |
| 5,070,875 | 12/1991 | Falck et al. | 128/645 |
| 5,148,807 | 9/1992 | Hsu | 128/645 |
| 5,203,331 | 4/1993 | Draeger | 128/652 |

FOREIGN PATENT DOCUMENTS 4221627  1/1994  Germany ............. 128/652

Primary Examiner—David C. Nelms
Assistant Examiner—John R. Lee
Attorney, Agent, or Firm—McAulay Fisher Nissen Goldberg & Kiel

[57] ABSTRACT

A method and arrangements for determining an at least approximately circular contacting surface is disclosed. The primary object of finding a simple way of objectively determining the contacting surface of a deformable medium on a plane surface with high accuracy and at a low technical expense is met according to the invention in that a film waveguide is used as a plane surface. An incoherent, parallel, homogeneous bundle of light whose width widens one-dimensionally is coupled into this film waveguide and the decoupled light is fed to a photoreceiver array for recording one-dimensional intensity distributions. An evaluating unit generates a difference curve from a normal curve without contacting medium and from a measurement curve with contacting medium and the exact diameter of the contacting surface is determined from the distance of two associated extremes of the difference curve. The method and arrangements are preferably used in ophthalmology for the measurement of the applanation circle at the tonometer and for measuring liquid drops for the purpose of analysis.

14 Claims, 3 Drawing Sheets

METHOD AND ARRANGEMENT FOR DETERMINING AN AT LEAST APPROXIMATELY CIRCULAR CONTACTING SURFACE USING INCOHERENT LIGHT AND A FILM WAVEGUIDE

BACKGROUND OF THE INVENTION a) Field of the Invention

The invention is directed to a method and arrangements for determining an at least approximately circular contacting surface of a deformed medium on a plane surface, in particular for verifying an applanation circle in an applanation tonometer.

b) Background Art

The change in the optical characteristics of a waveguide when contacting a medium is the subject of various publications, e.g. on substance analysis (EP 403 468, GB 2 156 970, DE 37 23 159). These arrangements, which are constructed as chemo-sensors, are concerned only with detecting or verifying various substances in the adjacent media, wherein a selective, permeable waveguide layer or film in which the substances to be verified are diffused or bonded to this film undergo changes in optical density or in the index of refraction so that changes in the phase, polarity or intensity of the penetrating light can be detected. Further, a known solution is concerned with the change in the abovementioned physical characteristics brought about by a contacting surface of varying magnitude and is applied in ophthalmology for measuring the intraocular pressure of the human eye. It makes use of the same effective mechanism as that used in EP-OS 40 34 68 in that two vibrational modes which are oriented vertically to one another and in which different effective refractive indices act along the contacting surface with the aplanatic cornea of the eye are excited by coherent, linearly polarized light in a film waveguide. Phase differences accordingly result between the two modes and can be determined in various ways, e.g. in the form of a change in intensity when using a (linear) polarizer prior to a receiver.

However, a disadvantage in the known working principle consists in that the expenditure for determining the phase difference is still relatively high (lasers, polarizers and analysis of the change in intensity, costly adjustment of the polarizers), particularly for accurately determining the magnitude of the contact area.

OBJECT AND SUMMARY OF THE INVENTION

The primary object of the present invention is to find a simple way of objectively determining the contacting surface of a deformable medium on a plane surface with high accuracy and at a low technical expense.

In a method for determining an at least approximately circular contacting surface of a deformed medium on a plane surface, wherein a parallel bundle of light is coupled in a film waveguide arranged on the plane surface and the intensity of the parallel bundle of light passing through the film waveguide is measured by means of a photoreceiver array arranged downstream of the film waveguide, this object is met according to the invention in that a substantially incoherent bundle of light with extensive lateral widening or expansion is coupled into the film waveguide, a one-dimensional intensity distribution is picked up by the photoreceiver array, a normal curve of the intensity distribution is recorded in the absence of contact with the deformable medium, at least one measurement curve of the intensity distribution is recorded with contacting of the deformable medium, a difference curve of the intensity distribution is formed from the normal curve and measurement curved and an analysis of the difference curve is carried out at local extremes resulting from a shift in refraction or diffraction occurring at locations of a jump in the effective refractive index of the film waveguide at the edge of the surface of contact with the deformable medium vertically to the direction of the bundle of light, and the corrected metric distance between associated pairs of extremes is determined.

In so doing, the values of the difference curve are advantageously compared to the absolute signal quantities so that the extremes may be evaluated as unambiguously as possible.

A further improvement can be achieved in that, for example, the parallel bundle of light is linearly polarized and only the $TM_0$ mode is excited in the film waveguide. The metric distance between two associated local extremes is advisably determined in that an intensity threshold is set with respect to the magnitude of the extremes, the metric distance between extremes when reaching the intensity threshold is detected at the outer (with reference to the position of the contacting surface of the deformable medium) flanks of the two local extremes and is corrected by adding a constant correction value which depends on the distance between the deformable medium and the photoreceiver array.

The subject matter of the invention further involves a method for determining an applanation circle in an applanation tonometer in which a tonometer body with a film waveguide arranged thereon for measuring the applanation force is pressed on an eye until reaching a determined diameter of the applanation circle, a parallel bundle of light is coupled into the film waveguide and its intensity distribution is recorded by means of a photoreceiver array. The method is characterized in that a substantially incoherent bundle of light is coupled into the film waveguide, a normal curve of the intensity distribution is recorded in the absence of contact with the eye, at least one measurement curve of the intensity distribution with applanated eye is recorded, a difference curve of the intensity distribution is formed from the normal curve and measurement curve, an analysis of the difference curve is effected on local extremes resulting from an occurrence of refraction or diffraction at locations of a jump in the effective refractive index of the film waveguide at the applanation circle vertically to the direction of the bundle of light, and the corrected metric distance between two local extremes is determined.

$TM_0$ mode excitation of the film waveguide and standardization or normalization of the difference curve are also advisable in this method.

Further, the subject matter of the invention includes arrangements for determining an at least approximately circular contacting surface of a deformable medium at a plane surface and for determining an applanation circle at an applanation tonometer having a film waveguide as contacting surface for the deformable medium or for the applanation circle of an eye, an illuminating device for coupling in a parallel bundle of light in the film waveguide, and a photoreceiver array for recording an intensity distribution emerging from the film waveguide. The object of the invention mentioned above is met, according to the invention, by means of these arrangements in that the illuminating device contains a substantially incoherent light source, in that the parallel bundle of light generated by the illuminating device is at least wide enough to (substantially) exceed the expected widening of the contacting surface or applanation circle, and in that an evaluating device is arranged downstream of the photoreceiver array and contains means for storing a normal curve and at least one measurement curve, means for generating a difference curve from the normal curve and measurement curve, and means for determining local extremes of the difference curve and their spacing as a measurement for the widening of the contacting surface or applanation circle.

The arrangements are advantageously supplemented by a polarizer in the beam path of the parallel bundle of light prior to its coupling into the film waveguide so that when the $TM_0$ mode is excited in the film waveguide a greater change in the effective refractive index and accordingly a more definite evaluation of the extremes may be achieved. Further, it is advisable in designing the evaluating unit to provide means for normalizing the values of the difference curve to the absolute values of the measurement curve.

The basic idea of the invention consists in determining the magnitude of the contacting surface of a liquid or solid deformable medium by making use of the local changes in intensity caused by the influence of the light at the edge of the surface of contact between the deformable medium and the film waveguide rather than using the costly means associated with two-mode excitation and interference evaluation. The physical background for the realization of this concept consists in the fact that the film waveguide has a changed effective refractive index in the region of the contacting surface of the deformable medium. The lateral boundary of this region with reference to the parallel bundle of light represents a phase jump in the film waveguide to the noncontacting region of the film waveguide and leads to changes in the intensity distribution. However, in order to visualize the changed intensity distribution, it is necessary to compare it with the original intensity distribution in the absence of contact with the medium in question. This comparison may be carried out in a meaningful manner by generating a difference curve by means of evaluating techniques.

The method according to the invention and the associated arrangements for realizing the method make it possible to determine the magnitude of an approximately circular contacting surface in an objective manner at a low technical expense. The invention can be used advantageously to determine the applanation circle in applanation tonometers based on the tonometer principle of GOLDMANN (Ophthalmologica 134, 1957, 221). A further advantageous application consists in determining the magnitude of droplets of liquid on specimen slides or the like plane surfaces for purposes of analysis.

For a better understanding of the present invention, reference is made to the following description and accompanying drawings while the scope of the invention will be pointed out in the appended claims.

DESCRIPTION OF THE PREFERRED EMBODIMENTS

Figure 1:
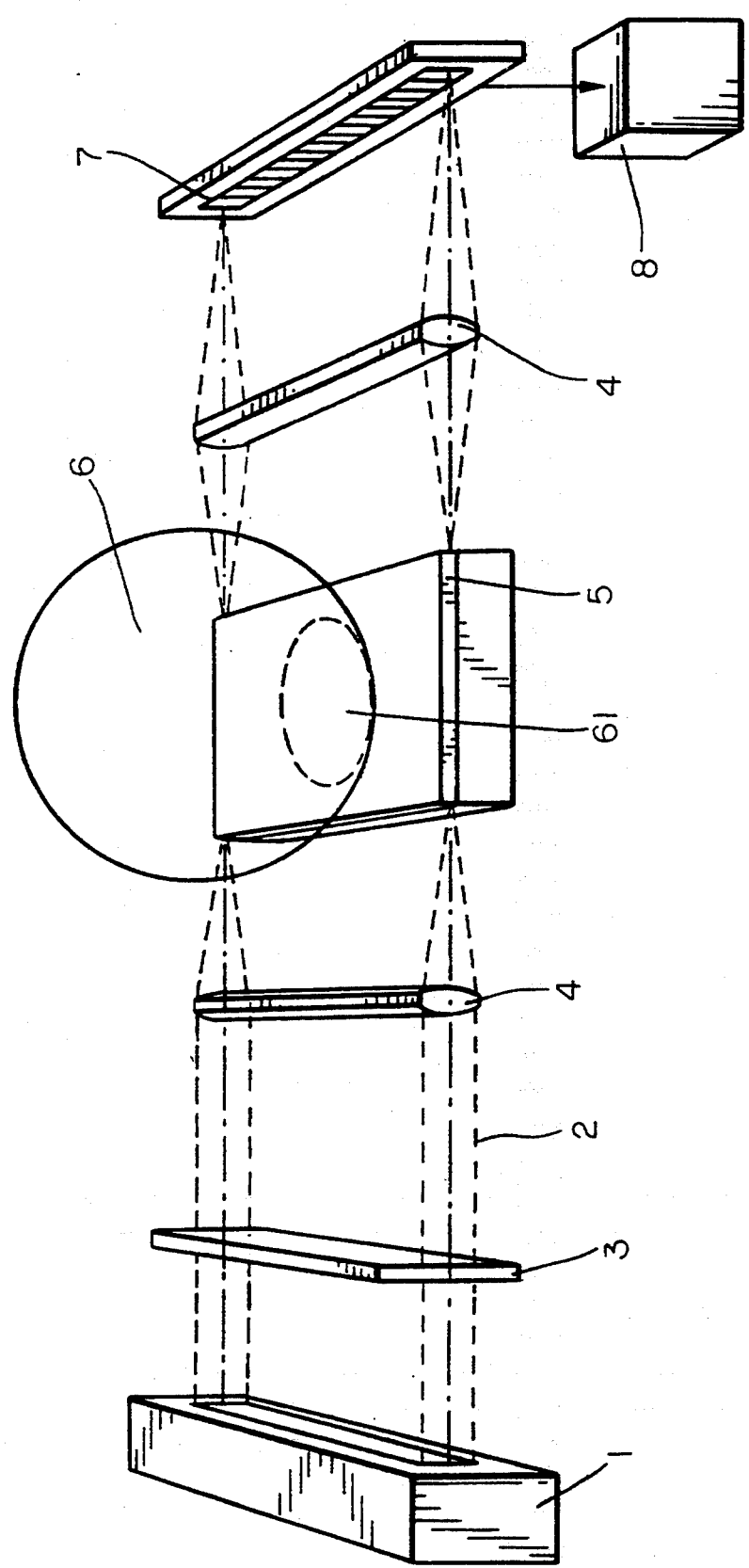
FIG. 1 shows an optical diagram of the arrangement according to the invention.

As may be seen with reference to the special arrangement according to FIG. 1, the basic steps of the method according to the invention consist in coupling a wide, substantially incoherent bundle of light 2 into a film waveguide 5 on which lies a determined contacting surface of the object to be measured (applanation circle 61 in FIG. 1), decoupling and receiving the bundle of light 2 by means of a photoreceiver array 7 for recording an intensity distribution, storing a normal curve 81 as an intensity distribution when the film waveguide 5 is not in contact and at least one measurement curve 82 in the presence of a corresponding contacting surface of the object to be measured with the film waveguide 5, calculating a difference curve 83 from the normal curve and measurement curve 81 and 82, respectively, and determining the extremes as reference or measurement marks for the position of the edge of the contacting surface based on a jump in the effective refractive index in these regions.

Figure 3:
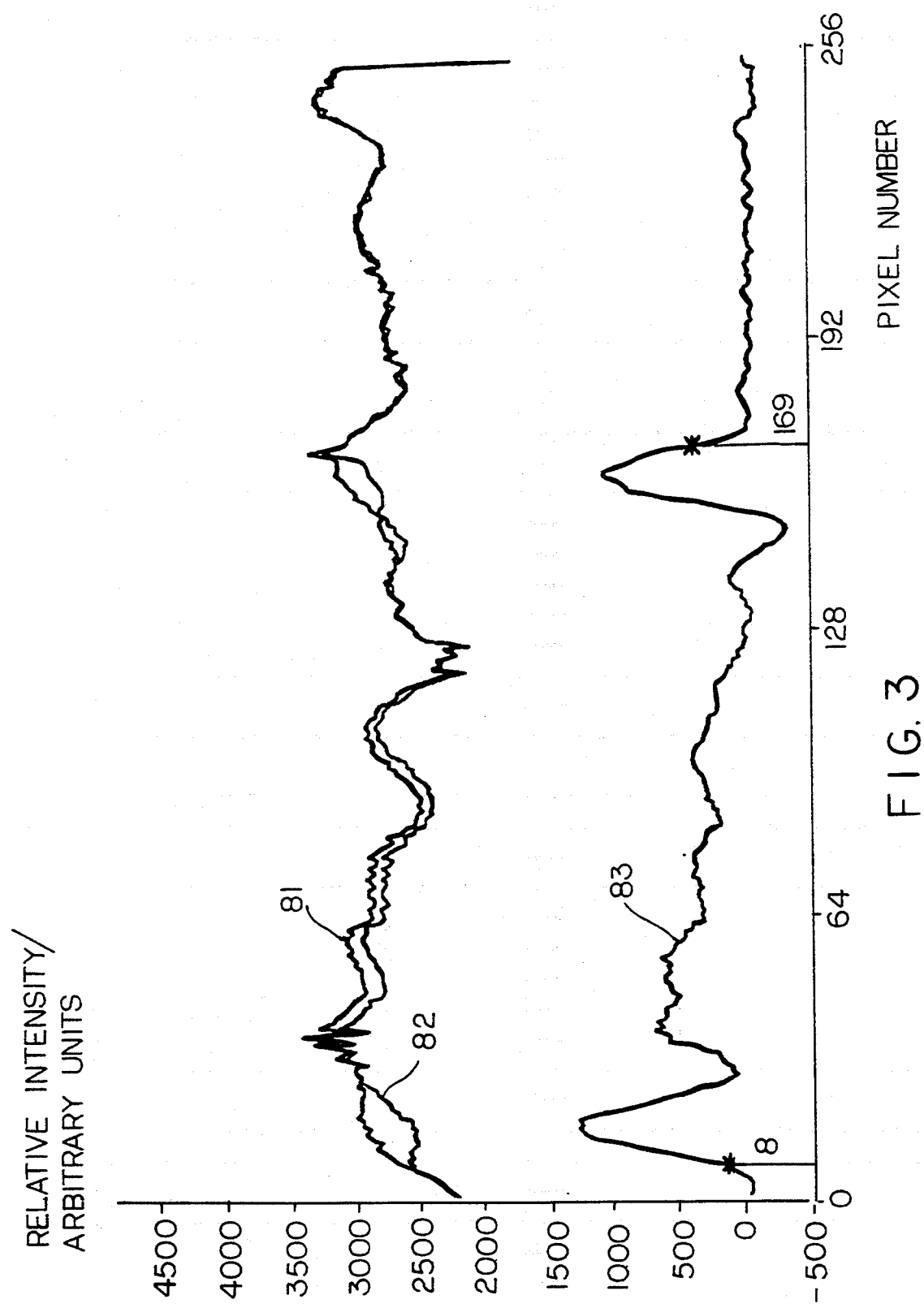
FIG. 3 shows a graph of the normal curve, measurement curve and difference curve.

An arrangement for determining an applanation circle 61 will be described in the following without limiting the universality. As shown in FIG. 1, an illuminating device 1 emits a substantially incoherent, virtually parallel and homogeneous bundle of light 2 which is widened substantially in one dimension. In order to couple in this bundle of light 2, it is advisably focussed on the end face of the film waveguide 5 via a cylindrical lens 4. When passing through the film waveguide 5, the bundle of light 2 is influenced in the region of the contacting surface—in this case the applanation circle 61 of a human eye 6. The consequences of this will be discussed in the following. The bundle of light 2 emerging from the film waveguide 5 is focussed on the photoreceiver array 7 via an additional cylindrical lens 4 and is converted optoelectronically as a one-dimensional intensity distribution and fed to an evaluating device 8. Signals of the photoreceiver array 7 are first stored in this evaluating device 8 in the absence of contact between the film waveguide 5 and an object as a so-called normal curve 81 as shown in FIG. 3.

In the next step carried out in the actual measuring process, at least one intensity distribution 9 is selected from the photo receiver array 7 during contact with the object to be measured, an applanated eye 6, whose measurement variable is the applanation circle 61 as contacting surface at the film waveguide 5. Since contact with the eye causes a change in the effective refractive index below the applanation circle 61, changes in intensity in the photoreceiver array 7 are to be expected. The qualitative effect is shown schematically in FIG. 2. However, as is shown in FIG. 3 by the shape of the measurement curve 82 recorded during contact with the eye 6, the changes are minimal and appear to subside in noise. However, direct comparison of the individual signals of the measurement curve 82 with that of the normal curve 81 provides data capable of evaluation. For this purpose, a difference curve 83 is generated in the evaluating device 8 via the pixel scanning raster of the photoreceiver array 7 which makes visible the changes in the local intensity distribution of the bundle of light 2 in the region of the edge of the applanation circle 61. These changes are caused by the refraction and diffraction of the light due to a jump in the effective refractive index in the film waveguide 5 below the periphery of the applanation circle 61.

Figure 2:
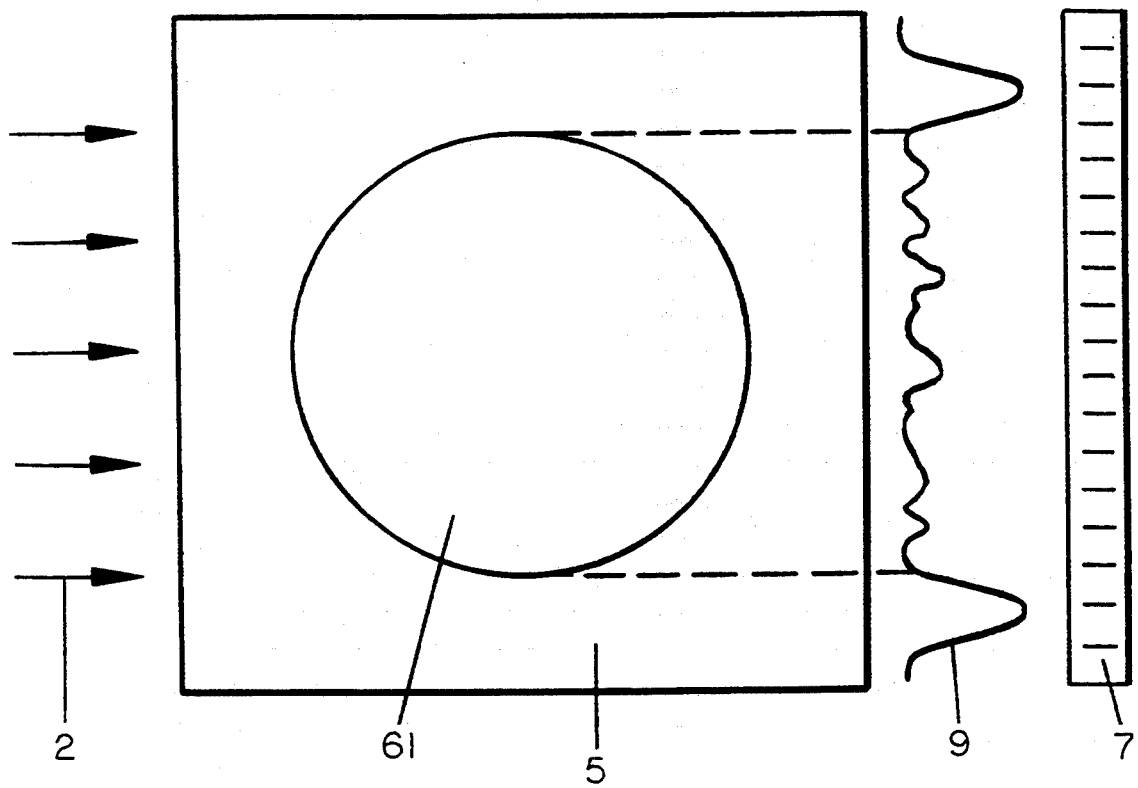
FIG. 2 is a schematic view of the affect of the applanation circle on the guided light.

FIG. 2 illustrates the effect of the jump in the effective index of refraction in the region of the periphery of the applanation circle 61 on the distribution of light intensity. The parallel light 2 guided in the film waveguide 5 undergoes refraction and diffraction particularly in the region of the periphery in that the jump in the index of refraction is effected vertically to the direction of the light. This results in the characteristic minima of the intensity distribution 9 which represents the difference between the intensity distributions prior to contact with the eye and during contact with the eye. The two characteristic minima in the calculated difference curve 83 are used for determining the diameter. At their outer flank, the position of a pre-set threshold value—preferably 10% of the limiting value—is determined and their distance is determined. As shown in FIG. 2, this distance is greater than the diameter of the applanation circle. However, the true diameter of the applanation circle 61 is obtained by subtracting a constant correction value whose magnitude depends on the distance between the photoreceiver array 7 and the applanation circle 61.

The local extremes (produced as maxima in FIG. 3) of the difference curve 83 allow the diameter of the applanation circle 61 to be determined based on accurate knowledge of the pixel raster of the photoreceiver array 7. Instead of the value of the local maximum, the value at the outer flank at which the maximum value has dropped to approximately 10% is used for exact determination of the diameter. It should be noted that the width of the intensity distribution 9 increases as the distance of the receiver array 7 from the applanation circle 61 increases, so that the diameter of the applanation circle 61 measured in this way is greater than the true diameter by an amount depending on the concrete arrangement in question.

Thus, this amount is to be subtracted from the measurement value of the measurement curve 82 (FIG. 3) in order to obtain the true diameter. The correction value is determined empirically by comparison with the diameters obtained, e.g., by a measurement microscope.

While the foregoing description and drawings represent the preferred embodiments of the present invention, it will be obvious to those skilled in the art that various changes and modifications may be made therein without departing from the true spirit and scope of the present invention.

What is claimed is:

1. A method for determining an at least approximately circular contacting surface of a deformed medium on a plane surface, wherein a parallel bundle of light is coupled in a film waveguide arranged on the plane surface and the intensity of the parallel bundle of light passing through the film waveguide is measured by means of a photoreceiver array arranged downstream of the film waveguide, comprising the steps of:
   coupling a substantially incoherent bundle of light with extensive lateral widening into the film waveguide;
   recording a one-dimensional intensity distribution by the photoreceiver array;
   recording a normal curve of the intensity distribution in the absence of contact with the deformable medium;
   recording at least one measurement curve of the intensity distribution with contact of the deformable medium;
   forming a difference curve of the intensity distribution from the normal curve and measurement curve;
   effecting an analysis of the difference curve at local extremes resulting from a shift in refraction or diffraction occurring at locations of a jump in the effective refractive index of the film waveguide at the edge of the surface of contact with the deformable medium vertically to the direction of the bundle of light; and
   determining the corrected metric distance between associated pairs of extremes.

2. The method according to claim 1, wherein the ratio of the difference curve to the absolute signal quantities is determined.

3. The method according to claim 1, wherein the $TM_0$ mode is excited to achieve a large change in the index of refraction in the film waveguide.

4. The method according to claim 1, including the steps of determining the metric distance between two associated local extremes in that an intensity threshold is set, with respect to the magnitude of the extremes, for the metric distance between the extremes when reaching the intensity threshold at the outer flanks of the two local extremes with reference to the position of the contacting surface and correcting the metric distance by the addition of a constant which depends on the distance between the deformable medium and the photoreceiver array.

5. A method for determining an applanation circle in an applanation tonometer in which a tonometer body with a film waveguide arranged thereon for measuring the applanation force is pressed on an eye until reaching a determined diameter of the applanation circle, a parallel bundle of light is coupled into the film waveguide and its intensity is recorded by means of a photoreceiver, comprising the steps of:
   coupling a substantially incoherent bundle of light with extensive lateral widening into the film waveguide;
   recording a one-dimensional intensity distribution by means of a photoreceiver array;
   recording a normal curve of the intensity distribution in the absence of contact with the eye;
   recording at least one measurement curve of the intensity distribution with applanated eye;
   forming a difference curve of the intensity distribution from the normal curve and measurement curve;
   effecting an analysis of the difference curve at local extremes resulting from an occurrence of refraction or diffraction at locations of a jump in the effective refractive index of the film waveguide at the applanation circle vertically to the direction of the bundle of light; and
   determining the corrected metric distance between two local extremes.

6. The method according to claim 5, wherein the difference curve refers to the absolute intensity values.

7. The method according to claim 5, wherein the $TM_0$ mode is excited in order to achieve a large change in the index of refraction in the film waveguide.

8. The method according to claim 5, including the steps of determining the metric distance between the local extremes in that an intensity threshold is set, with respect to the magnitude of the extremes, detecting the metric distance between extremes when reaching the intensity threshold at the outer flanks of the two local extremes with reference to the position of the contacting surface of the deformable medium and correcting the metric distance by adding a constant which depends on the distance between the object to be measured and the photoreceiver array.

9. In an arrangement for determining an at least approximately circular contacting surface of a deformable medium at a plane surface, wherein a film waveguide is arranged on the plane surface and, in a defined manner, an illuminating device for generating a substantially parallel bundle of light is arranged prior to the film waveguide and a photoreceiver array is arranged downstream of the film waveguide for recording an intensity distribution, the improvement comprising:

that said illuminating device contains a substantially incoherent light source, said parallel bundle of light generated by the illuminating device being at least wide enough to substantially exceed the expected compass or widening of the deformable medium; and an evaluating device being arranged downstream of the photoreceiver array and including means for storing a normal curve and at least one measurement curve, means for generating a difference curve from the normal curve and measurement curve, and means for determining local extremes of the difference curve and their distance from one another as a measurement for the widening of the contacting surface.

10. The arrangement according to claim 9, wherein a polarizer is arranged between the illumination device and film waveguide for exciting the $TM_0$ mode of the film waveguide.

11. The arrangement according to claim 9, wherein the evaluating device includes in addition, means for normalizing the difference curve to absolute intensity values of the measurement curve.

12. In an arrangement for verifying an applanation circle at an applanation tonometer having a tonometer body with a film waveguide arranged thereon, at which tonometer body an applanation force can be measured when producing an applanation circle at an eye, having an illuminating device for coupling a parallel bundle of light into the film waveguide, and a photoreceiver array for recording an intensity distribution emerging from the film waveguide, the improvement comprising:

that said illuminating device contains a substantially incoherent light source, said parallel bundle of light generated by the illuminating device being at least wide enough to substantially exceed the expected diameter of the applanation circle; and an evaluating device being arranged downstream of the photoreceiver array and including means for storing a normal curve and at least one measurement curve, means for generating a difference curve from the normal curve and measurement curve, and means for determining local extremes of the difference curve and their distance from one another as a measurement for the diameter of the applanation circle.

13. The arrangement according to claim 12, wherein a linear polarizer is arranged between the illuminating device and film waveguide for exciting the $TM_0$ mode of the film waveguide.

14. The arrangement according to claim 12, wherein the evaluating device additionally includes means for normalizing the difference curve to absolute intensity values of the measurement curve.

* * * * *